(12) United States Patent
Yamamoto et al.

(10) Patent No.: US 7,826,319 B2
(45) Date of Patent: Nov. 2, 2010

(54) OPTICAL DISC RECORD MEDIUM, DISC PRODUCTION METHOD, RECORDING APPARATUS

(75) Inventors: Masanobu Yamamoto, Kanagawa (JP); Hiroshi Kawase, Kanagawa (JP); Seiji Kobayashi, Kanagawa (JP)

(73) Assignees: Sony Corporation, Tokyo (JP); START Lab Inc., Tokyo (JP)

(*) Notice: Subject to any disclaimer, the term of this patent is extended or adjusted under 35 U.S.C. 154(b) by 558 days.

(21) Appl. No.: 11/558,651

(22) Filed: Nov. 10, 2006

(65) Prior Publication Data
US 2007/0140071 A1 Jun. 21, 2007

(30) Foreign Application Priority Data
Nov. 14, 2005 (JP) .............................. 2005-329237

(51) Int. Cl.
G11B 7/24 (2006.01)
(52) U.S. Cl. ................ 369/47.46; 369/275.3; 369/275.4
(58) Field of Classification Search .............. 369/275.3, 369/275.4
See application file for complete search history.

(56) References Cited

U.S. PATENT DOCUMENTS

| | | | | |
|---|---|---|---|---|
| 4,716,560 A | * | 12/1987 | Itonaga | 369/275.2 |
| 5,539,722 A | * | 7/1996 | Nomoto | 369/121 |
| 5,587,901 A | * | 12/1996 | Yamagami et al. | 369/275.3 |
| 6,236,637 B1 | * | 5/2001 | Nagasawa et al. | 369/275.3 |
| 6,295,271 B1 | * | 9/2001 | Inui et al. | 369/275.4 |
| 6,310,851 B1 | * | 10/2001 | Tobita et al. | 369/111 |
| 6,630,219 B2 | * | 10/2003 | Hirokane et al. | 428/64.4 |
| 6,665,240 B1 | * | 12/2003 | Kobayashi et al. | 369/47.15 |
| 2001/0009709 A1 | * | 7/2001 | Hirokane et al. | 428/64.1 |
| 2003/0223342 A1 | * | 12/2003 | Muramatsu et al. | 369/59.25 |
| 2007/0104066 A1 | * | 5/2007 | Abranovich et al. | 369/59.19 |

FOREIGN PATENT DOCUMENTS

| JP | 62089253 A | * | 4/1987 |
|---|---|---|---|
| JP | 05114164 A | * | 5/1993 |
| JP | 2004185767 A | * | 7/2004 |

* cited by examiner

*Primary Examiner*—Wayne R Young
*Assistant Examiner*—Brenda Bernardi
(74) *Attorney, Agent, or Firm*—Oblon, Spivak, McClelland, Maier & Neustadt, L.L.P.

(57) ABSTRACT

A guide groove is formed without wobbles. The guide groove is periodically modulated with its width. Encrypted data are recorded with marks formed on the record film along the guide groove. Information recorded by periodically modulating the guide groove with its width can be accurately detected by a band pass filter. Thus, rotation control information and address information can be stably reproduced. In addition, since the guide groove is formed without wobbles, a drive device having a pirated disc determination mechanism can reproduce encrypted content as with a ROM disc.

18 Claims, 8 Drawing Sheets

GR (GROOVE: GUIDE GROOVE)

D (DISC), D-S (STAMPER)

OPTICAL DISC RECORD MEDIUM, DISC PRODUCTION METHOD, RECORDING APPARATUS

CROSS REFERENCES TO RELATED APPLICATIONS

The present invention contains subject matter related to Japanese Patent Application No. 2005-329237 filed in the Japanese Patent Office on Nov. 14, 2005, the entire contents of which being incorporated herein by reference.

BACKGROUND OF THE INVENTION

1. Field of the Invention

The present invention relates to an optical disc record medium having a record film on which a guide groove is formed in such a manner that data are recordable and to a production method thereof. In addition, the present invention relates to a recording apparatus that records data on such an optical disc.

2. Description of the Related Art

In an optical disc record medium on which data are capable of being recorded, for example CD-R (Compact Disc-Recordable), DVD-R (Digital Versatile Disc-Recordable) or DVD-RW (ReWritable), a helical guide groove (hereinafter may be referred to as a groove) is formed at a predetermined track pitch. Information is recorded in the guide groove or a portion formed between adjacent paths formed thereof as tracks. In these recordable discs, rotation control information for a spindle motor and address information are recorded by wobbling the groove. In other words, to record data on a record medium, it is necessary to control a spindle motor to rotate at a predetermined rotation rate. The rotation rate is controlled so that a rotation synchronous signal (rotation control information) obtained on the basis of a detection result of wobbling of the groove becomes a predetermined frequency. For example, CLV (Constant Linear Velocity) that keeps a linear velocity constant is used. In addition, an access to a predetermined address is accomplished with address information embedded as wobbles.

Figure 1:
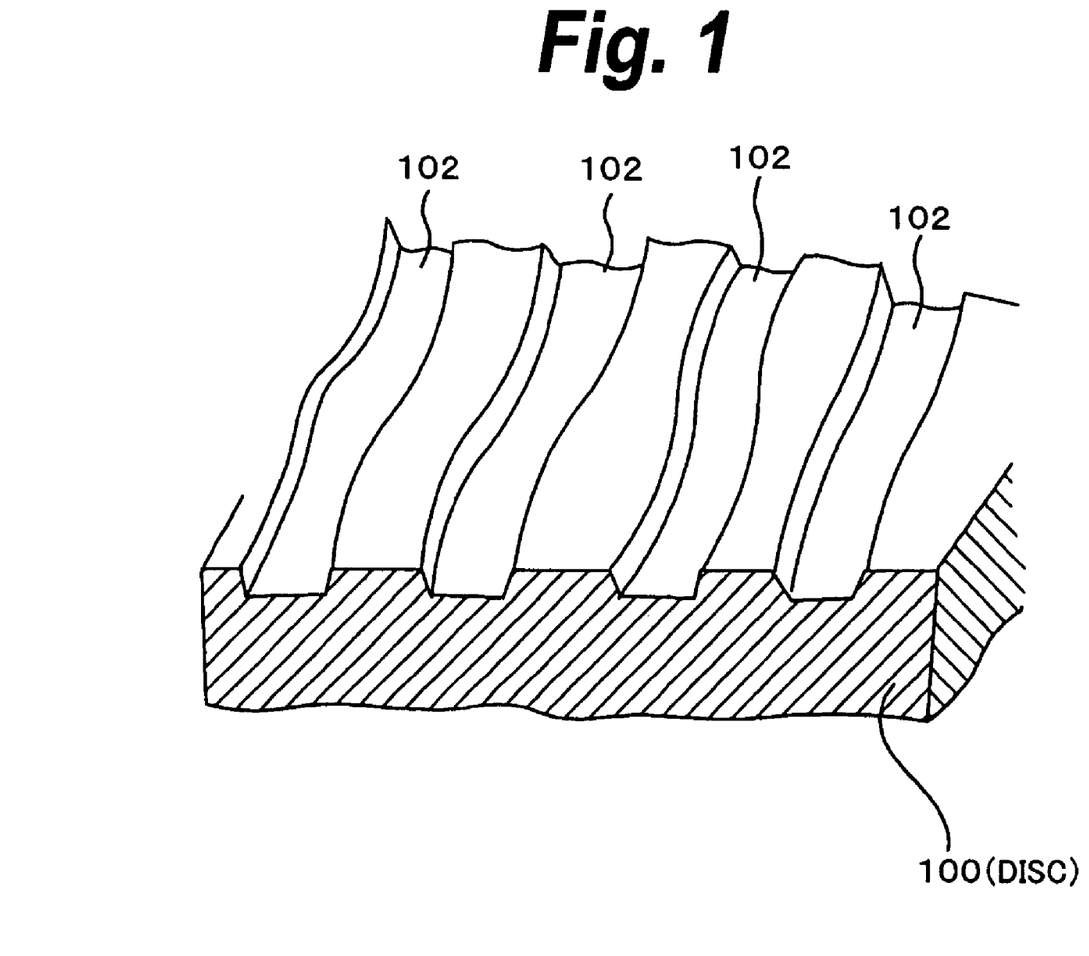
FIG. 1 is a perspective view showing the structure of a record surface of a recordable disc of related art.

FIG. 1 shows an example of wobbling of a groove formed on a disc 100 of related art. In this drawing, a part of the disc 100 of related art is cut out and the shape of the data record surface is shown with a perspective view. In FIG. 1, a guide groove 102 is helically formed on the data record surface of the disc 100. The guide groove 102 is wobbled on the basis of the foregoing rotation control information, address information, and so forth. The guide groove 102 is wobbled on the basis of an FM signal. In other words, a predetermined frequency as the rotation control information is referred to as a carrier frequency. The carrier frequency is frequency-modulated on the basis of address information. The guide groove 102 is wobbled on the basis of a signal obtained as the result of the FM signal. When a drive device side records data on the disc 100, since a tracking error signal contains an frequency modulation (FM) signal on the basis of the wobbling of the guide groove 102, the FM signal is extracted by a band pass filter or the like. The carrier (center frequency) of the FM signal is detected as the rotation control signal. The address information is obtained by demodulating the FM signal itself.

For CD-ROM and MD (Mini Disc), the center frequency of the wobbling is set at for example 22.05 kHz±1 kHz so that it does not adversely affect tracking servo and data reproduction. Likewise, for DVD−R and DVD+R, for example 140.6 kHz and 817.4 kHz are selected as their center frequencies of the wobbling, respectively, so that they do not adversely affect tracking servo and data reproduction.

Thus, the recordable discs of related art have a feature in that desired information such as rotation control information and address information are recorded by wobbling a groove. Information recorded by wobbling a groove can be detected with a push-pull signal. Thus, even if a groove is slightly wobbled, it can be detected with a relatively high sensitivity. Many drive devices are provided with a push-pull signal detection unit so as to detect wobbling of a groove with a high accuracy in such a manner.

Some drive devices for optical disc record mediums may be provided with a mechanism that detects wobbling and determines whether a loaded optical disc is a recordable disc. When the mechanism has determined that the loaded disc be a recordable disc, the mechanism may restrict the operation of the drive device.

The type of a disc has been determined by the determination mechanism mainly for countermeasures against pirated discs. In other words, it can be considered that there is a case of which content of an optical disc record medium sold as a reproduction-only (ROM) disc is illegally copied to recordable discs without permission of the copyright owner and the copied discs are supplied as so-called pirated discs. To prevent such pirated discs from being produced, it is determined whether the type of a disc is recordable depending on whether wobbling has been detected. When the determined result denotes that the disc is a recordable disc and the recorded content is reproduction-only content, assuming that the disc is a pirated disc, the reproduction of content is stopped.

It can be determined whether the content is reproduction-only content depending on whether the content has been encrypted according to CCS (Contents Scrambling System) method.

It is needless to say that such countermeasures against pirated discs have been effective and are important to protect legal rights of copyright owners. However, in recent years, as optical disc record mediums have been widely used, situation for such countermeasures is becoming changed. In other words, legal copyright owners are wanting to intentionally record content to recordable discs and distribute them. It can be said that since reproduction-only ROM discs have a simple structure, resulting in excellent mass producibility and high cost-performance, they are very suitable for mediums for content to be mass-distributed. However, this condition is applied only for the case that the number of discs produced is large. If the number of discs produced is small, the cost for reproduction-only ROM discs may be higher than that for recordable discs with respect to the total cost from production of a disc master to production of final products. Thus, the copyright owner side is desiring to distribute content with recordable discs in the case that mass-distribution of content is not expectable.

However, as can be understood from the foregoing description, wobbles are formed on recordable discs. Thus, if content of a ROM disc has been simply recorded on a recordable disc and distributed therewith, when a user's drive device reproduces the content from the recordable disc, the device detects wobbles, incorrectly determines that the disc be a pirated disc, and stops the reproduction of the content.

Figure 2:
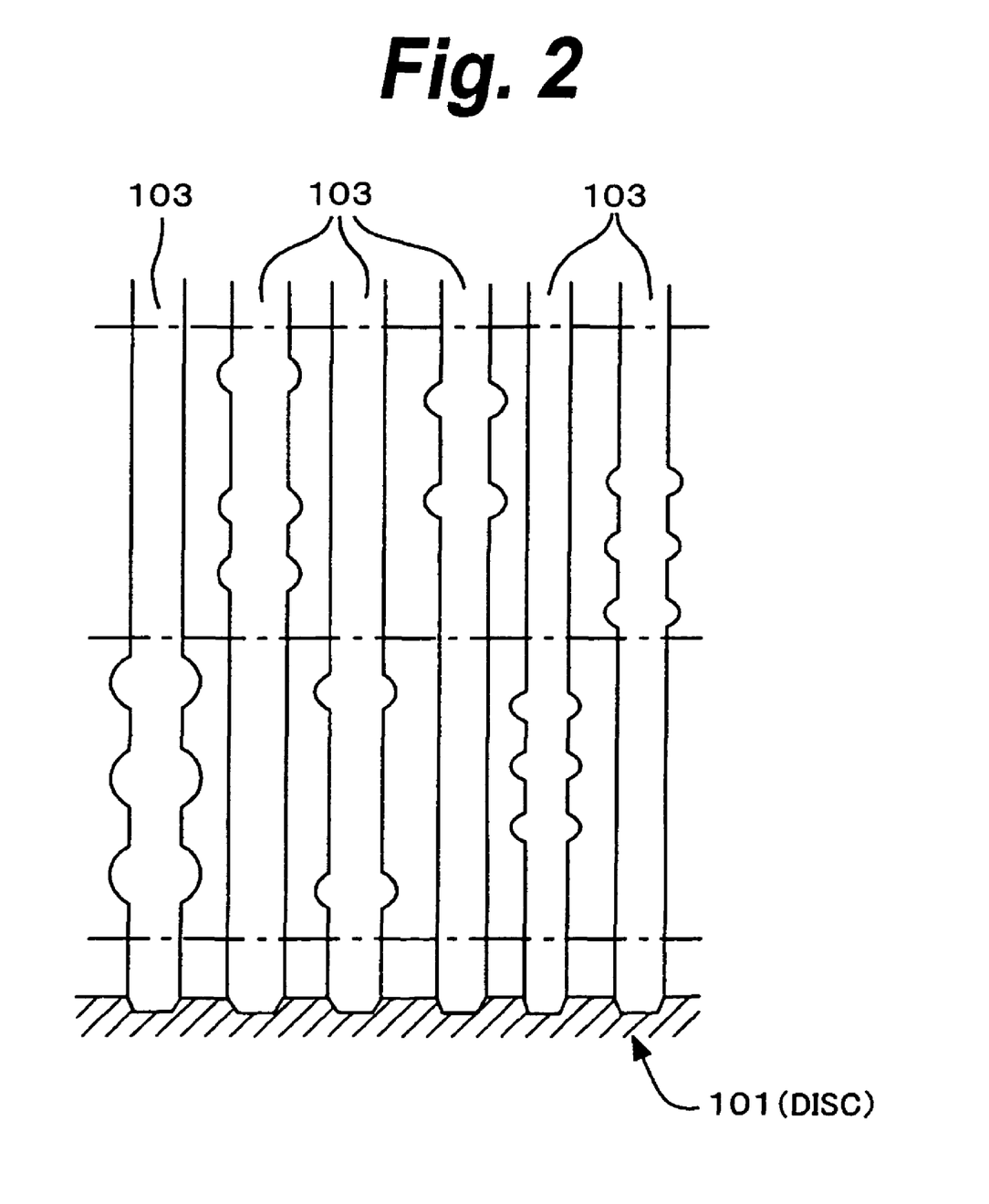
FIG. 2 is also a perspective view showing the structure of a record surface of a recordable disc of related art.

As a solution in such a situation, it is thought that rotation control information for a spindle motor, address information, and so forth are recorded without a wobble signal. As a technology that accomplishes such a solution, there is for example Japanese Patent Application Laid-Open No. HEI 9-17033 (patent document 1). Specifically, in the technology of patent document 1, as shown in FIG. 2, the width of a groove is partly enlarged. Information is recorded depending on whether there are enlarged width portions in a groove. In this method, since required information such as address information can be recorded without necessity of wobbling a groove, a drive device provided with such a determination mechanism can prevent a recordable disc on which reproduction-only content has been recorded from being incorrectly determined to be a pirated disc.

SUMMARY OF THE INVENTION

However, if information is recorded by modulating a groove with its width as in the foregoing patent document 1, since the distance from the center axis of the groove to the side wall thereof is always laterally symmetrical, information is not capable of being detected with a push-pull signal. Specifically, in this method, information is recorded and reproduced depending on whether there are enlarged width portions. In this point, the detection accuracy of information is relatively low. Thus, practically, it is very difficult to stably reproduce information.

In view of the foregoing problem, it would be desirable to stably record and reproduce information such as rotation control information and address information to and from a recordable disc without necessity of using wobbles.

In the present invention, from the foregoing problem, a disc record medium of the present invention has the following structure. In other words, an optical disc record medium of the present invention is an optical disc record medium having a record film on which a guide groove is formed in such a manner that data are recordable. The guide groove is formed without wobbles. The guide groove is periodically modulated with its width. Encrypted data are recorded with marks formed on the record film along the guide groove.

Moreover, in the present invention, a disc production method is performed as follow. In other words, a disc production method of the present invention is a disc production method of producing an optical disc record medium having a record film on which a guide groove is formed in such a manner that data are recordable. The disc production method includes the step of cutting a disc master driven to rotate by periodically modulating laser power of laser light, moving the laser light in a radial direction of the disc master, and exposing the disc master with the laser light such that the guide groove is formed on the disc master without wobbles and is periodically modulated with its width. In addition, the disc production method includes the step of producing an optical disc record medium by producing a disc substrate with a stamper produced based on the disc master through the cutting step and forming at least the record film on the disc substrate. Moreover, the disc production method includes the step of recording encrypted data with marks formed on the record film by radiating the record film along the guide groove on the optical disc record medium with laser light.

Moreover, in the present invention, a recording apparatus has the following structure. In other words, a recording apparatus of the present invention is a recording apparatus which records data on an optical disc record medium having a record film on which a guide groove is formed in such a manner that data are recordable, predetermined information being recorded by forming the guide groove without wobbles and periodically modulating the guide groove with its width. The recording apparatus includes information obtainment means for obtaining the predetermined information based on a detected result of a period for which the guide groove is modulated with its width. In addition, the recording apparatus includes laser light radiation means for radiating the record film along the guide groove with laser light. Moreover, the recording apparatus includes record control means for controlling the laser light radiation means such that encrypted data are recorded with marks formed by radiating the record film with the laser light.

According to the present invention, by periodically modulating a non-wobbled guide groove with its width, information can be recorded. In other words, information can be reproduced using periodicity for which the guide groove is modulated with the width. Since periodicity for which the groove is modulated with the width can be detected with a narrow band pass filter, a relatively high detection accuracy for information is secured and information can be stably detected.

Thus, according to the present invention, information such as rotation control information and address information can be stably detected from a non-wobbled recordable disc. On the optical disc record medium according to the present invention, encrypted content is recorded with marks formed along a guide groove. In other words, with such an optical disc record medium, when a drive device provided with a pirated disc determination mechanism reproduces content therefrom, the drive device recognizes the recorded content as reproduction-only content. However, since the drive device does not detect wobbles of a guide groove, the drive device can be prevented from incorrectly determining that the optical disc record medium be a regular recordable disc. As a result, with the optical disc record medium according to the present invention, the drive device provided with the pirated disc determination mechanism can normally reproduce content therefrom as in the case that encrypted content has been recorded on a reproduction-only ROM disc,

DETAILED DESCRIPTION OF THE PREFERRED EMBODIMENTS

Figure 3:
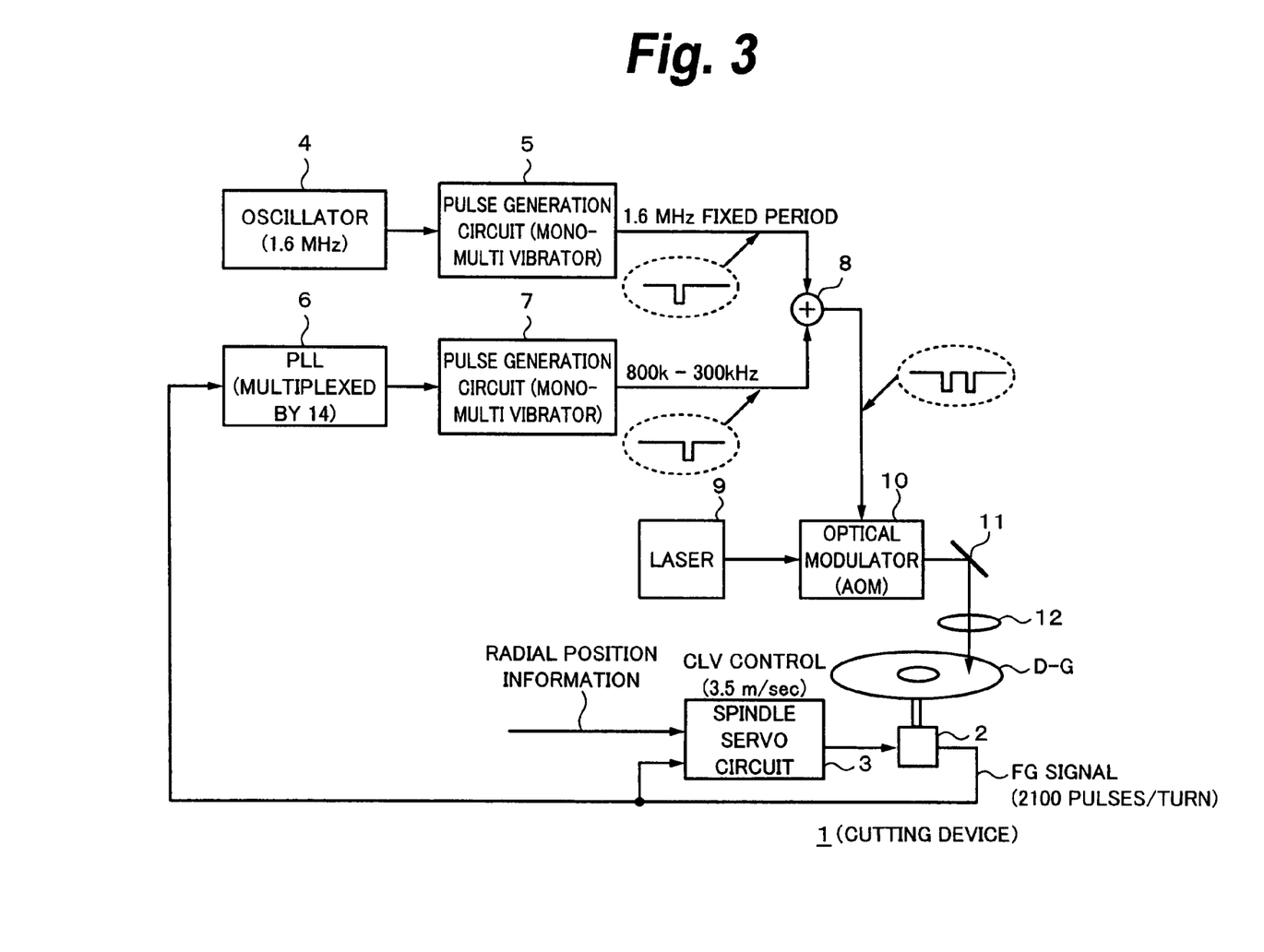
FIG. 3 is a block diagram showing the structure of a cutting device that produces an optical disc record medium according to an embodiment of the present invention.

Next, preferred embodiments of the present invention (hereinafter simply referred to as embodiments) will be described. FIG. 3 is a block diagram showing the internal structure of a cutting device 1 that is necessary to produce an optical disc record medium according to an embodiment of the present invention. The cutting device 1 is responsible for a cutting process in a production process of a disc D according to an embodiment of the present invention (before data are recorded on a record film with marks).

Next, for ascertainment, a production process of a disc D will be described. The production process can be largely divided into a mastering process and a replication process. The mastering process is a process performed until a stamper has been completed. The replication process is a process of which discs D are mass-produced as copies by the stamper.

In the mastering process, photo resist is coated on a polished glass substrate. As a result, a disc master D-G is produced. Thereafter, a cutting process is performed for the disc master D-G by exposing the disc master D-G with a laser beam and forming a guide groove (groove) on the disc master D-G. After the cutting process has been completed, a predetermined process such as a developing process is performed for the disc D-G. Thereafter, the groove is transferred onto the front surface of a metal by electro-casting. As a result, a stamper D-S that is necessary to replicate the disc D is produced. Thereafter, with the stamper D-S, the groove is transferred onto a resin substrate for example by injection method. Thereafter, a record film is formed on the grooved resin substrate. As a result, a semi-product is obtained. Thereafter, a process for forming the semi-product in a disc shape is performed. As a result, a disc D is obtained. In the following description, the case of which a DVD (Digital Versatile Disc) type recordable disc is produced as a disc D will be described.

Returning to FIG. 3, the cutting device 1 will be described. In FIG. 3, the disc master D-G is driven to rotate by a spindle motor 2. The spindle motor 2 is controlled to rotate by a spindle servo circuit 3 in such a manner that the spindle motor 2 rotates at a constant linear velocity, namely in the CLV mode. Disposed at a bottom portion of the spindle motor 2 is a pulse generator (not shown). The pulse generator generates an FG signal as the spindle motor 2 rotates. Whenever the spindle motor 2 rotates for one turn, the pulse generators generates for example 2100 pulses as the FG signal. The spindle servo circuit 3 inputs the FG signal and radial position information that represents the radial position of a collected position of laser light with which the disc master D-G is radiated as will be described later. The radial position information can be supplied from a thread mechanism or the like that moves for example a mirror 11 and an objective lens 12 (these members will be described later) in the radial direction of the disc master D-G. The spindle servo circuit 3 controls the spindle motor 2 to gradually change the frequency of the FG signal on the basis of the radial position information so that the spindle motor 2 rotates at a constant linear velocity, namely in the CLV mode. In this case, the linear velocity of the spindle motor 2 is set for example at 3.5 m/sec.

An oscillator 4 oscillates a signal having a constant period. In this case, the oscillation frequency of the oscillator 4 is set at 1.6 MHz. A pulse generation circuit 5 is for example a mono-multi vibrator. The pulse generation circuit 5 generates a negative short pulse as shown in the drawing corresponding to an edge of the signal supplied from the oscillator 5. Pulses generated by the pulse generation circuit 5 are supplied to an optical modulator 10.

On the other hand, a PLL (Phase Locked Loop) circuit 6 inputs the FG signal outputted from the spindle motor 2, multiplies the frequency of the FG signal by 14, and outputs the resultant signal. As a result, a clock signal that causes one turn of the disc master D-G to be divided into 2100×14=29400 is obtained.

A pulse generation circuit 7 is composed of a mono-multi vibrator. The pulse generation circuit 7 generates a negative short pulse corresponding to an edge of the clock supplied from the PLL circuit 6. The pulse repetitive period changes nearly from 800 kHz to 300 kHz with the cutting radius. In other words, the pulse repetitive period for one turn of the innermost circumference of the disc master D-G is 800 kHz, whereas the pulse repetitive period for one turn of the outermost circumference of the disc master D-G is 300 kHz. Since the oscillation of the PLL circuit 6 synchronizes with the rotation of the disc master D-G, hereinafter an output of the pulse generation circuit 7 may be referred to as the CAV (Constant Angular Velocity) signal.

An adding device 8 adds an output of the pulse generation circuit 5 and an output of the pulse generation circuit 7 and outputs the resultant signal to the optical modulator 10.

A laser 9 is composed of a gas laser or the like and emits a laser beam to the optical modulator 10. The optical modulator 10 is composed of an AOM (Acoustic Optical Modulator) or the like. The optical modulator 10 turns on and off the laser beam corresponding to the output of the adding device 8, namely the levels of pulses supplied from the pulse generation circuit 5 and the pulse generation circuit 7. The optical path of the laser beam is bent at an angle corresponding to the direction of the disc master D-G by the mirror 11. The laser beam is collected on the record surface of the disc master D-G through the objective lens 12.

The mirror 11 and the objective lens 12 are successively moved in the radial direction of the disc master D-G by the thread mechanism (not shown). In other words, the laser beam collection position is successively moved for example in the outer circumferential direction of the disc master D-G. Thus, a spirally (helically) successive guide glove is formed on the disc master D-G.

In the process of successively and helically forming a guide groove, only on/off control is performed for the laser beam. Thus, the groove is formed without wobbles. In addition, as described above, while the pulse generation circuit 5 and the pulse generation circuit 7 are generating negative pulses, the optical modulator 10 shuts off the laser beam. In other words, while the pulse generation circuit 5 and the pulse generation circuit 7 are generating negative pulses, the width of the groove is slightly narrowed.

Figure 4:
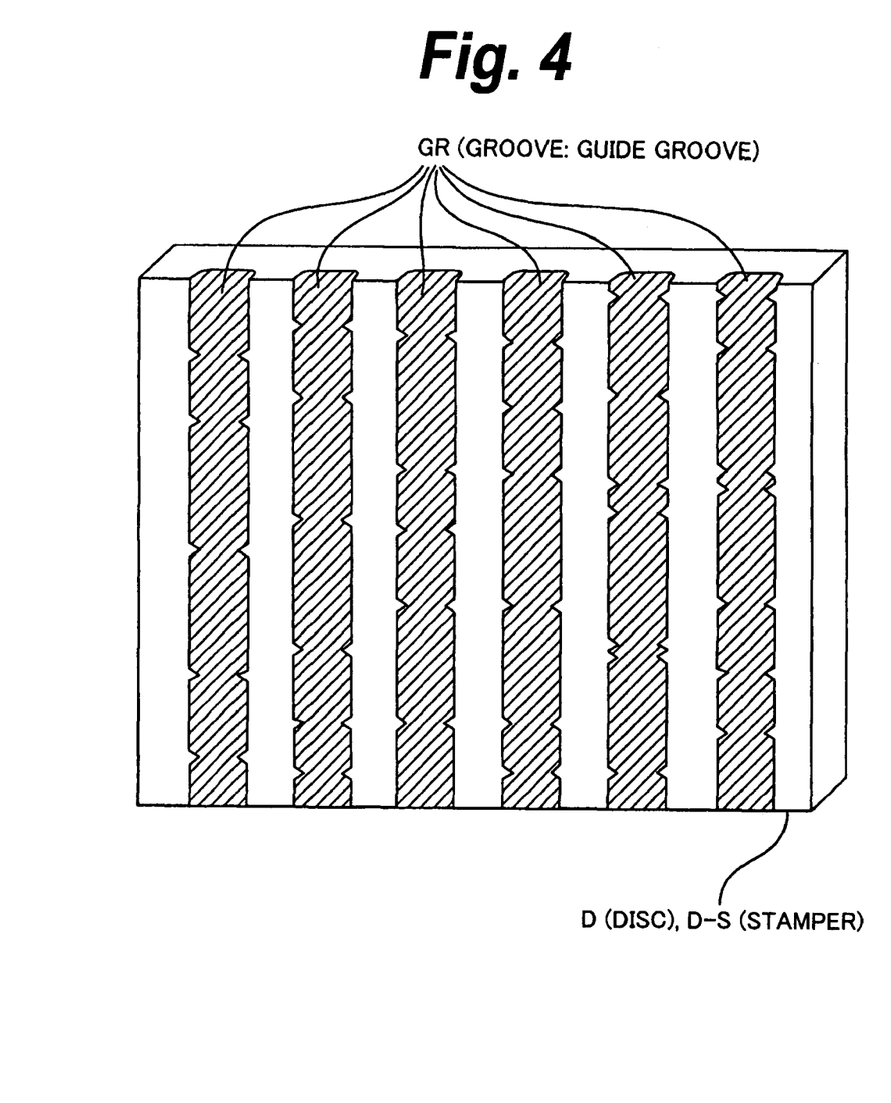
FIG. 4 is a perspective view showing the structure of a record surface of a stamper (optical disc record medium) produced by the cutting device shown in FIG. 3.

As a result, as the groove GR (guide groove) helically and successively formed on the record surface of the disc master D-G, as shown in FIG. 4, regions of which the width is narrowed are formed at a period (1.6 MHz) of the output signal of the pulse generation circuit 5 and at a period (800 kHz to 300 kHz) of the output signal of the pulse generation circuit 7. In FIG. 4, a part of the disc master D-G is cut out and the shape of the recording surface is shown with a perspective view.

A developing process and a plating process are performed for the disc master D-G produced in the forgoing manner. As a result, a stamper D-S is produced. With the stamper D-S, information (namely, periodical width modulation) is transferred onto a resin substrate. Thereafter, a record film is formed on the resin substrate and then the resultant semi-product is formed in a desired disc shape. As a result, a disc D is produced. A groove GR that is the same as that on the disc master D-G shown in FIG. 4 is formed on the record surface of the disc D.

Figure 5:
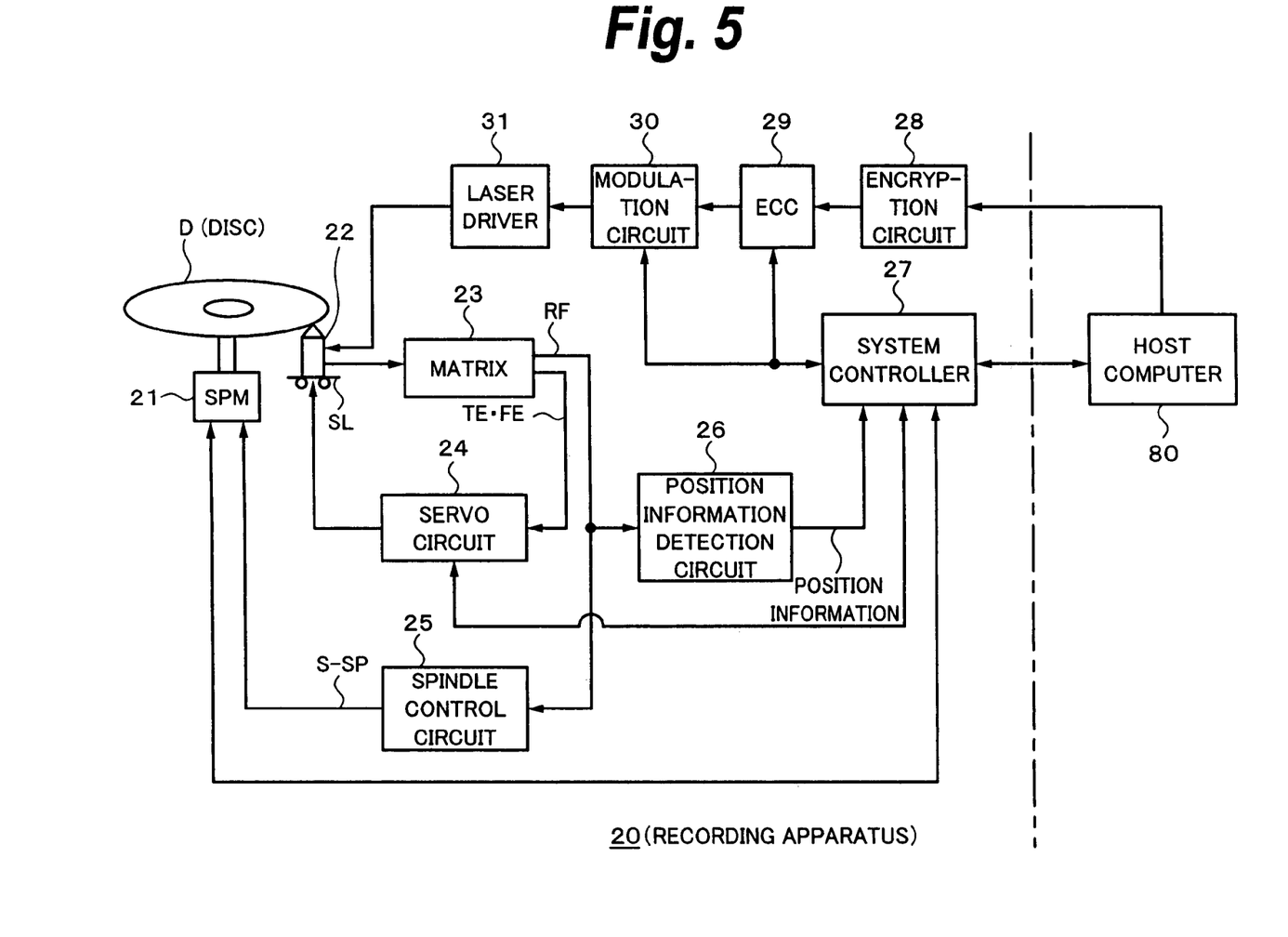
FIG. 5 is a block diagram showing the structure of a recording apparatus according to an embodiment of the present invention.

FIG. 5 shows the internal structure of a recording apparatus 20 that records encoded content to the disc D in such a manner that the recording apparatus 20 forms marks on the record film. In FIG. 5, record data as content to be recorded on the disc D are supplied from a host computer 80 disposed outside the recording apparatus 20. The record data supplied from the host computer 80 are input to an encryption circuit 28. The encryption circuit 28 encrypts the record data according to CSS (Contents Scrambling System) technique. The encrypted record data are supplied to an ECC (Error Correcting Code) circuit 29. As well known, in CSS technique, an encryption bit that denotes that content has been encrypted is embedded in each sector. When the drive device reproduces content from the disc, the drive device references the encryption bit and determines whether content recorded on the disc D (strictly, a recorded disc D-R, which will be described later) has been encrypted.

The ECC circuit 29 adds an error correction code to the record data. In addition, the ECC circuit 29 performs an interleave process for the data in which the error correction code has been added. As a result, even if a defect or a dropout takes place on the disc D, data can be securely reproduced.

A modulation circuit 30 performs a modulation process for the data inputted from the ECC circuit 29 according to EFM (8/16) modulation system. The modulation circuit 30 generates a mark signal of which level 1 and level 0 occur at a period of which a predetermined period is multiplied by any integer. At this point, a DC component of the mark signal is suppressed. In addition, a synchronous pattern is periodically inserted into the mark signal. The mark signal is supplied to a laser driver 31.

An optical pickup 22 is composed of a laser diode, an optical system that guides laser light outputted from the laser diode to the record surface of the disc D, an objective lens that collects light guided by the optical system on the record surface of the disc D, a photo detector that detects reflected light from the disc D, and so forth. In the optical pickup 22, the objective lens is held by a biaxial mechanism in such a manner that the objective lens is movable in the tracking direction and focus direction. The whole optical pickup 22 is movable in the radial direction of the disc by a thread mechanism SL.

The laser driver 31 drives the laser diode of the optical pickup 22 to emit light corresponding to the mark signal. As a result, marks are formed on the record film, namely data are recorded.

In the optical pickup 22, information of the reflected light from the disc D is detected by the photo detector. The photo detector converts the information of the reflected light into an electric signal corresponding to the amount of the received light and supplies the electric signal to a matrix circuit 23. The matrix circuit 23 is provided with pluralities of current-voltage conversion circuits, matrix calculation/amplification circuits, and so forth corresponding to currents outputted from a plurality of light receiving elements of the photo detector. The matrix circuit 23 performs a matrix calculation process and generates necessary signals, for example a radio frequency signal (also referred to as an RF signal) that is equivalent to reproduction data and a focus error signal FE and a tracking error signal TE that are used for a servo control.

The focus error signal FE and the tracking error signal TE outputted from the matrix circuit 23 are supplied to a servo circuit 24 as shown in the drawing. On the other hand, the RF signal outputted from the matrix circuit 23 is supplied to a spindle control circuit 25 and a position information detection circuit 26.

The servo circuit 24 generates various types of servo drive signals that are focus, tracking, and thread from the focus error signal FE and the tracking error signal TE and performs a servo operation. In other words, the servo circuit 24 generates a focus drive signal and a tracking drive signal corresponding to the focus error signal FE and the tracking error signal TE and drives a focus coil and a tracking coil of the biaxial mechanism of the optical pickup 22, respectively. Thus, a tracking servo loop and a focus servo loop composed of the optical pickup 22, the matrix circuit 23, the servo circuit 24, and the biaxial mechanism are formed.

In addition, the servo circuit 24 generates a thread drive signal on the basis of a thread error signal obtained as a low frequency component of the tracking error signal TE, an access execution control by a system controller 27, and so forth and drives the thread mechanism SL with the thread drive signal. The thread mechanism SL has a mechanism composed of a main shaft that holds the optical pickup 22, a thread motor, a transfer gear, and so forth (not shown). The thread mechanism SL drives the thread motor with the thread drive signal to slidably move the optical pickup 22 in a desired manner.

The spindle control circuit 25 controls a spindle motor (SPM) 21 to rotate in the CLV mode. The spindle motor 21 drives the disc D held on a turntable to rotate. In this case, the spindle control circuit 25 supplies a spindle control signal S-SP generated on the basis of the RF signal supplied from the matrix circuit 23 to the spindle motor 21 to control the spindle motor 21 to rotate. The internal structure of the spindle control circuit 25 will be described later.

The spindle motor 21 executes a start operation, a stop operation, an acceleration operation, and a deceleration operation for the motor corresponding to a spindle kick/brake control signal supplied from the system controller 27.

In addition, the position information detection circuit 26 detects position information that represents an address on the disc D on the basis of the RF signal supplied from the matrix circuit 23. The internal structure of the position information detection circuit 26 will be also described later.

Each operation of the foregoing servo system and the recording and reproducing system is controlled by the system controller 27 composed of a microcomputer. The system controller 27 executes various processes corresponding to commands issued by the host computer 80. For example, when the host computer 80 issues a write command to the system controller 27, it causes the optical pickup 22 to move to an address at which data are written. The system controller 27 causes the ECC circuit 29 and the modulation circuit 30 to execute the foregoing encoding process for record data (video data, audio data, and so forth according to various formats such as MPEG2). In addition, as described above, the mark signal is supplied from the modulation circuit 30 to the laser driver 31. The laser diode of the optical pickup 22 is driven to emit light corresponding to the mark signal. As a result, data are recorded on the disc D. At this point, since the tracking servo operation is performed by the foregoing tracking servo loop, marks are formed along the guide groove as the record film of the disc D is radiated with laser light.

In addition, according to this embodiment, the system controller 27 controls a switch 45 (which will be described later) to select a terminal corresponding to a command signal supplied from a passed signal energy comparison circuit 42 (which will be described later) of the spindle control circuit 25.

FIG. 5 shows the structure of a recording apparatus connected to the host computer 80. However, the recording apparatus according to the present invention may not be connected to another device. In this case, the recording apparatus may be provided with an operation section and a display section. In addition, the structure of the data input/output interface may be different from that shown in FIG. 5. In other words, data are recoded as an operation is performed for the recording apparatus. In addition, the recording apparatus may be provided with a terminal section that inputs and outputs various types of data.

The RF signal detected from reflected light of the disc D contains information recorded as changes of the width of the groove GR. However, as can be understood also with the recording method of information as changes of the width described with reference to FIG. 4, since the changes of the width are very small, the detection sensitivity is very low. In other words, it is very difficult for a regular binary circuit to accurately detect the changes of the width.

Figure 6:
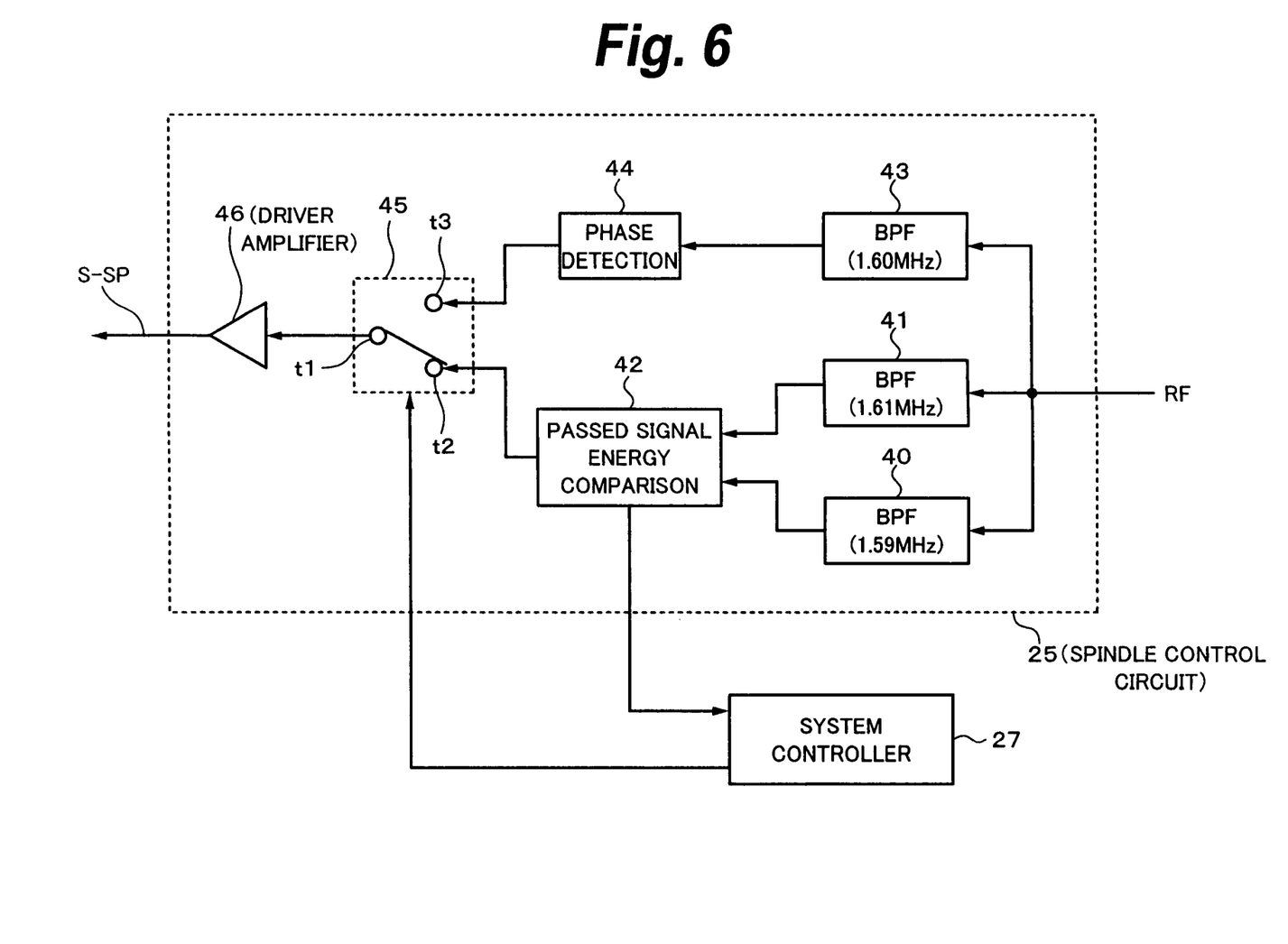
FIG. 6 is a block diagram showing the structure of a spindle control circuit with which the recording apparatus shown in FIG. 5 is provided.
Figure 7:
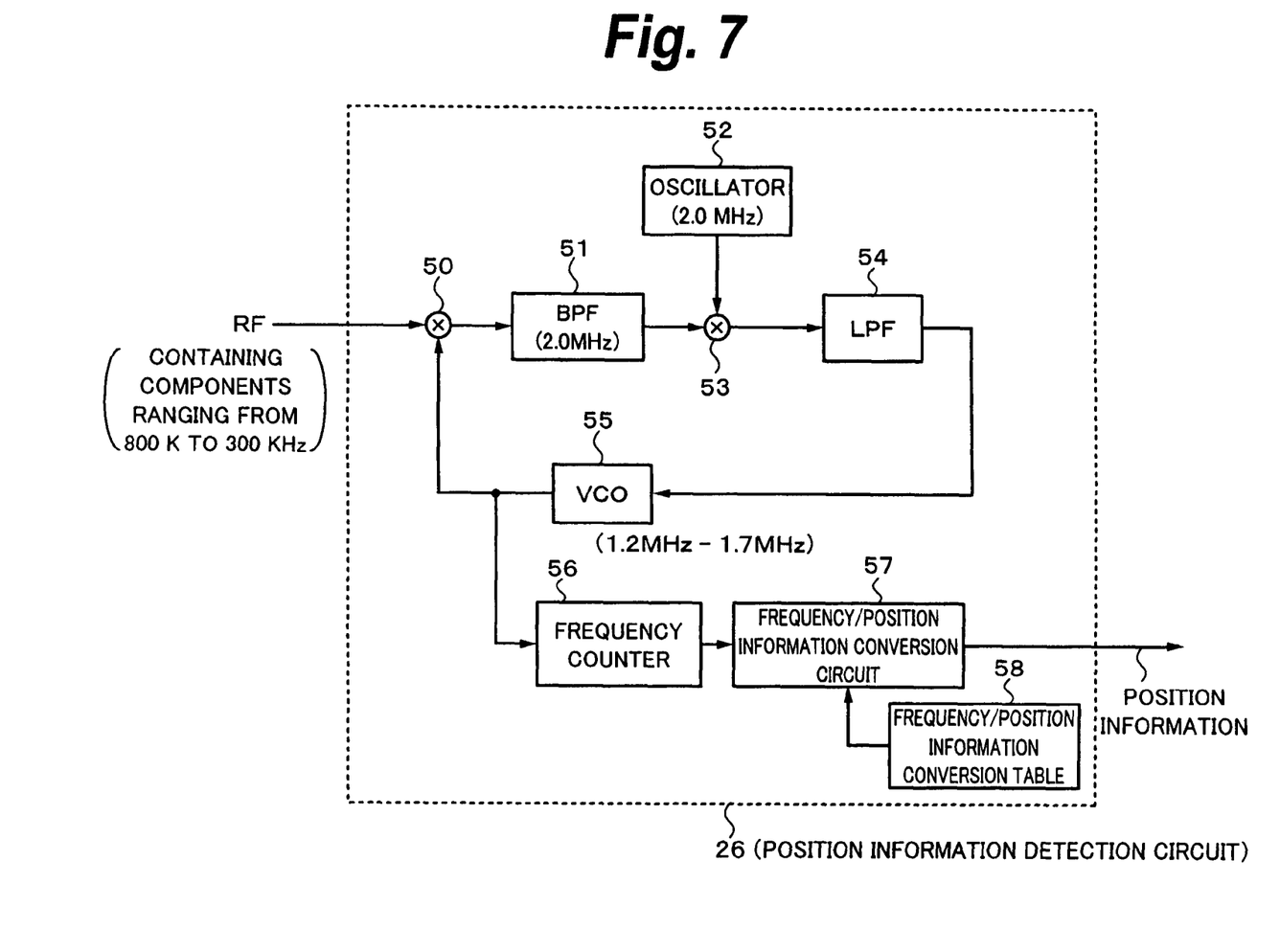
FIG. 7 is a block diagram showing the structure of a position information detection circuit with which the recording apparatus shown in FIG. 5 is provided.

Thus, in the recording apparatus 20, the spindle control circuit 25 and the position information detection circuit 26 shown in FIG. 5 are structured as shown in FIG. 6 and FIG. 7, respectively, so that information recorded by finely modulating the groove with its width can be accurately detected.

FIG. 6 shows the internal structure of the spindle control circuit 25. This drawing also shows the system controller 27 shown in FIG. 5. In FIG. 6, the RF signal supplied from the matrix circuit 23 shown in FIG. 5 is input to three narrow band pass filters (BPFs) 40, 41, and 43. The center frequency of the band pass filter 40 is set at 1.59 MHz. The center frequency of the band pass filter 41 is set at 1.61 MHz. In other words, the center frequencies of the band pass filters 40 and 41 are set at 1.6 MHz±1 MHz where 1.6 MHz is the frequency at which the disc D is controlled to rotate. Signals that have passed through the band pass filters 40 and 41 are supplied to the passed signal energy comparison circuit 42.

On the other hand, the center frequency of the band pass filter 43 is set at 1.6 MHz. A signal that has passed through the band pass filter 43 is supplied to a phase detection circuit 44. The phase detection circuit 44 detects the phase of the signal and filters the signal. The resultant signal is supplied to a terminal t3 of the switch 45 (which will be described later).

The passed signal energy comparison circuit 42 compares the level of energy of the signal that has passed through the band pass filter 40 with the level of energy of the signal that has passed through the band pass filter 41, calculates their difference, and outputs the difference. When the rotation frequency of the spindle motor 21 is correct, the level of energy of the signal that has passed through the band pass filter 40 is the same as the level of energy of the signal that has passed through the band pass filter 41. However, if the rotation rate of the spindle motor 21 is slightly lower than a predetermined value, the level of the output of the band pass filter 40 is slightly higher than the level of the output of the band pass filter 41. In contrast, if the rotation rate of the spindle motor 21 is slightly higher than the predetermined value, the level of the output of the band pass filter 41 is higher than the level of the output of the band pass filter 40. The detected signal is amplified by a driver amplifier 46 through the switch 45 (which will be described later). The resultant signal is supplied as a spindle control signal S-SP to the spindle motor 21. As a result, the rotation rate of the spindle motor 21 is controlled to almost become ideal. When the levels of the energies of the signals that have passed the two band pass filters 40 and 41 are the same, the passed signal energy comparison circuit 42 outputs a signal that denotes that the levels are the same to the system controller 27 also shown in FIG. 4. This signal is supplied as a command signal that causes a terminal of the switch 45 to be selected to the system controller 27. The system controller 27 selects a terminal of the switch 45 corresponding to this command signal. Specifically, the system controller 27 controls the switch 45 to select a terminal t3 instead of a terminal t2.

The switch 45 is structured to alternately select one of the terminal t2 and the terminal t3 against a terminal t1. As can be understood with the foregoing description, the terminal t2 is connected to the passed signal energy comparison circuit 42 and the terminal t1 is connected to the driver amplifier 46. In addition, the terminal t3 is connected to the band pass filter 43 through the phase detection circuit 44 as shown in the drawing.

After the rotation control is performed on the basis of the outputs of the band pass filters 40 and 41, since the terminal t3 of the switch 45 is selected, the output of the phase detection circuit 44 is supplied to the driver amplifier 46. In other words, the frequency control is switched to the phase control. As a result, the spindle motor 21 operates in the regular phase control (PLL) mode. In other words, the spindle motor 21 operates with a higher accuracy in the phase control mode than in the frequency control mode based on comparison of the levels of energies of signals supplied from the band pass filters 40 and 41. When it is not necessary for the spindle motor 21 to perform such a high accuracy rotation control, the band pass filter 43, the phase detection circuit 44, and the switch 45 can be omitted and the spindle motor 21 can be controlled to rotate only in the frequency control mode.

In such a structure, the three band pass filters 40, 41, and 43 can be narrow band filters having a pass frequency band of for example several hundred kHz. Thus, these filters can remarkably remove noise components from the RF signal. As a result, the recording apparatus 20 according to this embodiment can control the spindle motor 21 to accurately rotate with portions of which the groove is finely modulated with its width as shown in FIG. 4.

For ascertainment, it can be said that the reason why the rotation control information of the disc D can be accurately detected with the narrow band pass filters is in that the groove GR of the disc D is periodically modulated with the width of the groove GR.

FIG. 7 shows the internal structure of the position information detection circuit 26. First, a method of detecting position information in this case will be described briefly. As was described with reference to FIG. 4, the groove GR of the disc D is modulated with the width of the groove GR at a period that is fixed at 1.6 MHz of the rotation control information and at a period that varies in the range from 800 kHz to 300 kHz of the radial position on the disc D as the CAV signal. In this case, the position information is detected in such a manner that a component in the frequency band of 800 kHz to 300 kHz is extracted as the CAV signal obtained from the RF signal. Based on the frequency of the component in the range from 800 kHz to 300 kHz, the radial position on the disc D is estimated.

According to this embodiment, a PLL is composed of a multiplying circuit 50, a band pass filter 51, an oscillator 52, a multiplying device 53, a low pass filter (LPF) 54, and a VCO (Variable Frequency Oscillator) 55 as a narrow band filter, a frequency varying circuit, and a phase detection circuit. With the PLL, a component (800 kHz to 300 kHz) as the CAV signal is extracted from the RF signal.

Specifically, supplied to the multiplying device 50 are the RF signal from the matrix circuit 23 shown in FIG. 5 and an output signal of the VCO 55. The multiplied result is supplied to the band pass filter 51. The band pass filter 51 is a narrow band filter having a center frequency of for example 2 MHz that can pass only a signal having a frequency of around 2 MHz. The multiplying device 53 multiplies a signal that has passed through the band pass filter 51 by a signal having a fixed frequency of 2 MHz supplied from the oscillator 52. The low pass filter 54 passes only a low frequency component of the multiplied signal. The low frequency component drives the VCO 55. It is clear that this structure composes a PLL circuit.

When the PLL circuit having such a structure locks the CAV signal, a component as the CAV signal is extracted from the RF signal by the band pass filter 51. In this case, the frequency of the CAV signal varies with the radial position on the disc D. The oscillation frequency of the VCO 55 is automatically changed corresponding to the variation of the frequency of the CAV signal. In other words, when the center frequency of the CAV signal is denoted by Fc and the oscillation frequency of the VCO 55 is denoted by Fv, the oscillation frequency of the VCO 55 is automatically adjusted so that [formula 1] is satisfied.

$$Fc+Fv=2\text{ MHz} \quad\quad\quad \text{[Formula 1]}$$

Specifically, when the frequency of a component as the CAV signal contained in the RF signal is 800 kHz, the oscillation frequency of the VCO 55 becomes 2.0 MHz−800 kHz=1.2 MHz. Likewise, when the frequency of a component as the CAV signal is 300 kHz, the oscillation frequency of the VCO 55 becomes 2.0 MHz−300 kHz=1.7 MHz.

With such a PLL circuit, frequency components other than the CAV signal can be removed. As a result, the CAV signal recorded on the disc D by finely modulating the groove GR with its width can be securely and accurately detected.

A frequency counter 56 measures the frequency of the VCO 55. A frequency/position information conversion circuit 57 detects position information as information of the radial position on the disc D (namely, address information) based on the measured result of the frequency counter 56 and a frequency/position information conversion table 58. The relationship between the frequency of the CAV signal and the oscillation frequency of the VCO 55 is represented as "2 MHz−oscillation frequency of VCO 55=frequency of CAV signal" according to [Formula 1]. Thus, the frequency/position information conversion circuit 57 obtains the frequency of the CAV signal for example from "2 MHz−oscillation frequency of VCO 55". Thereafter, the frequency/position information conversion circuit 57 references the frequency/position information conversion table 58, which correlates the frequency of the CAV signal with the radial position, and detects the position information as information of the radial position information from the frequency/position information conversion table 58. The position information is supplied to the system controller 27 shown in FIG. 5. The position information can be treated as information almost equal to a track address. Thus, while the disc D is being random-accessed, data can be recorded thereon.

When the position information of the disc D is pre-correlated with the oscillation frequency of the VCO 55 as contents of information of the frequency/position information conversion table 58, the frequency/position information conversion circuit 57 can reference the table 58 with the measured result of the frequency counter 56 and detect the position information from the table 58.

In the structure of the recording apparatus 20, with marks formed along the groove on the disc D, content encrypted according to CSS by the encryption circuit 28 can be recorded. Hereinafter, a disc as a final product of which encrypted content has been recorded on the disc D is referred to as a recorded disc D-R.

Figure 8:
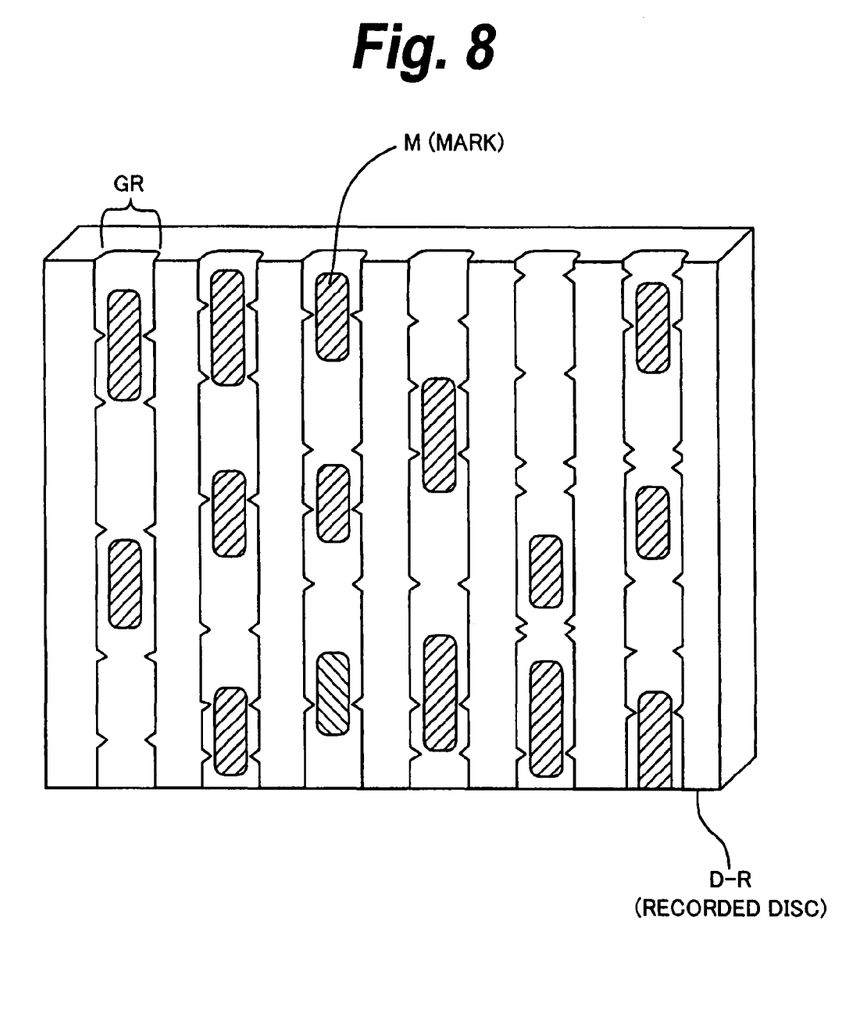
FIG. 8 is a perspective view showing the structure of a record surface of an optical disc recording medium (recorded disc) according to an embodiment of the present invention.

FIG. 8 shows the structure of a record surface of a recorded disc D-R. In FIG. 8, a part of the record surface is cut out and the shape of the record surface is shown with a perspective view. As shown in the drawing, marks M represented by hatched portions are formed along the groove GR periodically and finely modulated with its width. With the marks M, encrypted content is recorded. In this case, the marks M are formed in the groove GR (so-called groove-recorded). Instead, the marks M may be recorded in a land portion formed between adjacent paths of the groove GR.

When a drive device of related art reproduces content from an optical disc record medium, from a view point of copyright protection, the drive device may determine whether there are wobbles on the loaded optical disc record medium, determine whether the recorded content has been encrypted, and stop reproducing the content on the basis of the determined result. In other words, when encrypted reproduction only content has been recorded on a recordable optical disc record medium, it can be determined that the optical disc record medium be a pirated disc of which reproduction-only content has been illegally copied. Thus, when wobbles have been detected and the recorded content has been encrypted, assuming that the optical disc record medium is a pirated disc, the reproduction of the content is forced to be stopped.

While there are such drive devices, the copyright owner side is demanding to record encrypted reproduction-only content to recordable discs and to distribute them. In other words, if content is not likely to be mass-produced, the cost of which the content is recorded on recordable discs is lower than that of which content is recorded on ROM discs from a view point of the total cost from the production of a disc master to the production of final products. However, when encrypted reproduction-only content is recorded for example on DVD-R discs, a drive device having such a pirated disc determination function can detect wobbles and determine that encrypted content have been recorded. Thus, the drive device is not capable of reproducing the content.

In this circumstance, in the recorded disc D-R according to this embodiment, as a recordable disc on which encrypted content has been recorded, a groove is formed without wobbles. Thus, since the drive device can be prevented from detecting wobbles, it can recognize the recorded disc D-R as a regular ROM disc. In other words, the drive device can reproduce content from a recordable disc on which encrypted content has been recorded (reproduction-only content) as with a regular ROM disc.

In this embodiment, as a recordable disc on which a groove is formed without wobbles, by periodically and finely modulating the groove with its width, necessary information such as rotation control information and position information can be recorded. As was described above, since the groove is periodically modulated with its width, even if the groove is finely modulated with its width, record information can be accurately detected with a narrow band pass filter.

In other words, since record information can be accurately detected with a narrow band pass filter, the groove can be finely modulated with its width. Since the groove is finely modulated with its width, the groove can be prevented from affecting data that are reproduced as a sequence of marks recorded on the basis of the same RF signal. In other words, from a view point of reproduction of data recorded as a sequence of marks, a very small amount of noise is superimposed with the RF signal. Thus, the groove can be prevented from affecting content that is reproduced.

Moreover, in the recording apparatus 20 according to this embodiment, since periods for which the groove is modulated with its width are detected as rotation control information and position information periodically recorded on the disc D, the rotation control information and position information can be obtained on the basis of the detected periodic information. The recording apparatus 20 can drive the disc D to rotate according to a desired rotation control system (in this case, CLV) on the basis of the obtained rotation control information. In addition, the recording apparatus 20 can record data with a sequence of marks on the disc D while randomly accessing the disc D on the basis of the obtained position information.

Although embodiments of the present invention have been described, the present invention is not limited thereto. In the foregoing embodiments, as information recorded by modulating the groove with its width, both rotation control information and position information are recorded. Instead, either rotation control information or position information may be recorded. When only rotation control information is recorded, the disc D may be capable of being random-accessed by detecting the radial position on the disc D of a beam spot of laser light emitted for example from the optical pickup 22 with a sensor or the like that detects the radial position on the disc D. In contrast, when only position information is recorded, the disc D may be able to be driven to rotate in the CLV mode with the spindle motor 2, which outputs the FG signal, and the spindle servo circuit 3, which controls the rotation rate of the spindle motor 2 so that the frequency of the FG signal gradually varies corresponding to the supplied radial position information, for example, as in the cutting device 1 shown in FIG. 3.

In addition, the structure that extracts a component as the CAV signal from the RF signal is not limited to that shown in FIG. 7. As long as a component as the CAV signal can be extracted from the RF signal, another structure other than that shown in FIG. 7 may be used.

In addition, as information recorded by modulating the groove with its width, another information, for example, information for copyright protection may be recorded instead of rotation control information and position information described in the foregoing embodiments.

In the foregoing embodiments, the frequency that is set up as rotation control information, the frequency that is set up as the CAV signal, the rotation rate of the disc, the number of pulses of the FG signal are just examples. Thus, they are not limited to such values. However, of course, when both rotation control information and position information are recorded, if their frequencies overlap, it is difficult to accurately detect their information. Thus, it is preferred that their frequencies be in bands that are relatively apart.

In addition, according to the foregoing embodiments, as the recorded disc D-R (disc D), a DVD type recordable disc was exemplified. Instead, another type recordable disc may be used, for example CD (Compact Disc) or MD (Mini Disc: magneto optical disc). In this case, the frequency of rotation control information and so forth are changed on the basis of the disc type.

What is claimed is:

1. An optical disc record medium having a record film on which a guide groove is formed in such a manner that data are recordable, the medium comprising:
the guide groove having a substantially constant width and including width-varied portions, widths of the width-varied portions being different from the substantially constant width of the groove, a distance between the width-varied portions along the guide groove being periodically modulated, and encrypted data being recorded with marks formed on the record film along the guide groove,
wherein position information, which represents a radial position on the optical disc record medium, and fixed frequency information, which represents a predetermined rotational frequency of the optical disc record medium, are recorded by modulating the distance between the width-varied portions along the guide groove.

2. An optical disc record medium having a record film on which a guide groove is formed in such a manner that data are recordable, the medium comprising:
the guide groove having a substantially constant width and including width-varied portions, widths of the width-varied portions being different from the substantially constant width of the groove, a distance between the width-varied portions along the guide groove being periodically modulated, and encrypted data being recorded with marks formed on the record film along the guide groove,
wherein fixed frequency information, which represents a predetermined rotational frequency of the optical disc record medium with which the optical disc record medium is controlled to rotate, and position information, which represents a radial position on the optical disc record medium, are recorded by modulating the distance between the width-varied portions along the guide groove at different periods.

3. A disc production method of producing an optical disc record medium having a record film on which a guide groove is formed in such a manner that data are recordable, the disc production method comprising:
cutting a disc master driven to rotate by periodically modulating laser power of laser light, moving the laser light in a radial direction of the disc master, and exposing the disc master with the laser light such that the guide groove is arranged on the disc master to have a substantially constant width and to include width-varied portions, widths of the width-varied portions being different from the substantially constant width of the groove, and a distance between width-varied portions along the guide groove is periodically modulated;
producing an optical disc record medium by producing a disc substrate by a stamper produced based on the disc master through the cutting and forming at least the record film on the disc substrate;
recording encrypted data with marks formed on the record film by radiating the record film along the guide groove on the optical disc record medium with laser light; and
recording position information, which represents a radial position on the optical disc record medium, and fixed frequency information, which represents a predetermined rotational frequency for rotation of the optical disc record medium, by modulating the distance between the width-varied portions along the guide groove.

4. A recording apparatus which records data on an optical disc record medium having a record film on which a guide groove having a substantially constant width and including width-varied portions, widths of the width-varied portions being different from the substantially constant width of the groove, is formed in such a manner that data are recordable, and predetermined information is recorded by periodically modulating a distance between the width-varied portions along the guide groove, the recording apparatus comprising:
information obtainment means for obtaining the predetermined information based on a detected result of a period for which the distance between the width-varied portions along the guide groove is modulated;
laser light radiation means for radiating the record film along the guide groove with laser light; and
record control means for controlling the laser light radiation means such that encrypted data are recorded with marks formed by radiating the record film with the laser light,
wherein position information, which represents a radial position on the optical disc record medium, and fixed frequency information, which represents a predetermined rotational frequency for rotation of the optical disc record medium, are recorded thereon by periodically modulating the distance between the width-varied portions along the guide groove, and wherein the information obtainment means detects the position information based on a detected result of a period for which the distance between the width-varied portions along the guide groove is modulated.

5. A recording apparatus which records data on an optical disc record medium having a record film on which a guide groove having a substantially constant width and including width-varied portions, widths of the width-varied portions being different from the substantially constant width of the groove, is formed in such a manner that data are recordable, and predetermined information is recorded by periodically modulating a distance between the width-varied portions along the guide groove, the recording apparatus comprising:

information obtainment means for obtaining the predetermined information based on a detected result of a period for which the distance between the width-varied portions along the guide groove is modulated;

laser light radiation means for radiating the record film along the guide groove with laser light; and record control means for controlling the laser light radiation means such that encrypted data are recorded with marks formed by radiating the record film with the laser light, wherein fixed frequency information, which represents a predetermined rotational frequency of the optical disc record medium and with which the optical disc record medium is controlled to rotate, and position information, which represents a radial position on the optical disc record medium, are recorded by modulating the distance between the width-varied portions along the guide groove at different periods, and the information obtainment means includes rotation control information obtainment means for obtaining the fixed frequency information based on a detected result of one of the different periods for which the distance between the width-varied portions along the guide groove is modulated, and position information detection means for obtaining the position information and the fixed frequency information based on a detected result of another of the different periods for which the distance between the width-varied portions of the guide groove is modulated.

6. A recording apparatus which records data on an optical disc record medium having a record film on which a guide groove having a substantially constant width and including width-varied portions, widths of the width-varied portions being different from the substantially constant width of the groove, is formed in such a manner that data are recordable, and predetermined information is recorded by periodically modulating a distance between the width-varied portions along the guide groove, the recording apparatus comprising:

an information obtainment section which obtains the predetermined information based on a detected result of a period for which the distance between the width-varied portions along the guide groove is modulated;

a laser light radiation section which radiates the record film along the guide groove with laser light; and a record control section which controls the laser light radiation section such that encrypted data are recorded with marks formed by radiating the record film with the laser light, wherein position information, which represents a radial position on the optical disc record medium, and fixed frequency information, which represents a predetermined rotational frequency for rotation of the optical disc record medium, are recorded by periodically modulating the distance between the width-varied portions along the guide groove, and the information obtainment section detects the position information and the fixed frequency information based on a detected result of a period for which the distance between the width-varied portions along the guide groove is modulated.

7. A recording apparatus which records data on an optical disc record medium having a record film on which a guide groove having a substantially constant width and including width-varied portions, widths of the width-varied portions being different from the substantially constant width of the groove, is formed in such a manner that data are recordable, and predetermined information is recorded by periodically modulating a distance between the width-varied portions along the guide groove, the recording apparatus comprising:

an information obtainment section which obtains the predetermined information based on a detected result of a period for which the distance between the width-varied portions along the guide groove is modulated;

a laser light radiation section which radiates the record film along the guide groove with laser light; and a record control section which controls the laser light radiation section such that encrypted data are recorded with marks formed by radiating the record film with the laser light, wherein fixed frequency information, which represents a predetermined rotational frequency of the optical disc record medium and with which the optical disc record medium is controlled to rotate, and position information, which represents a radial position on the optical disc record medium, are recorded by modulating the distance between the width-varied portions along the guide groove at different periods, and the information obtainment section includes rotation control information obtainment section for obtaining the fixed frequency information with which the optical disc record medium is controlled to rotate based on a detected result of one of the different periods for which the distance between the width-varied portions along the guide groove is modulated, and position information detection section for obtaining the position information based on a detected result of another of the different periods for which the distance between the width-varied portions along the guide groove is modulated.

8. A disc production method of producing an optical disc record medium having a record film on which a guide groove is formed in such a manner that data are recordable, the disc production method comprising:

cutting a disc master driven to rotate by periodically modulating laser power of laser light, moving the laser light in a radial direction of the disc master, and exposing the disc master with the laser light such that the guide groove is formed on the disc master to have a substantially constant width and to include width-varied portions, widths of the width-varied portions being different from the substantially constant width of the groove, and a distance between the width-varied portions along the guide groove is periodically modulated;

producing an optical disc record medium by producing a disc substrate by a stamper produced based on the disc master through the cutting and forming at least the record film on the disc substrate;

recording encrypted data with marks formed on the record film by radiating the record film along the guide groove on the optical disc record medium with laser light; and recording fixed frequency information, which represents a predetermined rotational frequency of the optical disc record medium and with which the optical disc record medium is controlled to rotate, and position information, which represents a radial position on the optical disc record medium, by modulating the distance between the width-varied portions along the guide groove at different periods.

9. The optical disc record medium as set forth in claim 1, wherein the fixed frequency information, when read by a recording apparatus, is included in a radio frequency signal based on light reflected from the optical disc record medium, the radio frequency signal is received by three narrow band pass filters, a center frequency of one of the filters is set to the predetermined rotational frequency of the optical disc record medium, and an output of the filters is configured to control an actual rotation rate of the optical disc record medium.

10. The optical disc record medium as set forth in claim 2, wherein the fixed frequency information, when read by a recording apparatus, is included in a radio frequency signal based on light reflected from the optical disc record medium, the radio frequency signal is received by three narrow band pass filters, a center frequency of one of the filters is set to the predetermined rotational frequency of the optical disc record medium, and an output of the filters is configured to control an actual rotation rate of the optical disc record medium.

11. The disc production method as set forth in claim 3, further comprising:

reading, by a recording apparatus, the fixed frequency information, including the fixed frequency information in a radio frequency signal based on light reflected from the optical disc record medium;

receiving the radio frequency signal by three narrow band pass filters;

setting a center frequency of one of the filters to the predetermined rotational frequency of the optical disc record medium; and controlling an actual rotation rate of the optical disc record medium based on an output of the filters.

12. The recording apparatus as set forth in claim 4, further comprising:

three narrow band pass filters configured to receive a radio frequency signal based on light reflected from the optical disc record medium, a center frequency of one of the filters is set to the predetermined rotational frequency of the optical disc record medium, and an output of the filters is configured to control an actual rotation rate of the optical disc record medium.

13. The recording apparatus as set forth in claim 5, further comprising:

three narrow band pass filters configured to receive a radio frequency signal based on light reflected from the optical disc record medium, a center frequency of one of the filters is set to the predetermined rotational frequency of the optical disc record medium, and an output of the filters is configured to control an actual rotation rate of the optical disc record medium.

14. The recording apparatus as set forth in claim 6, further comprising:

three narrow band pass filters configured to receive a radio frequency signal based on light reflected from the optical disc record medium, a center frequency of one of the filters is set to the predetermined rotational frequency of the optical disc record medium, and an output of the filters is configured to control an actual rotation rate of the optical disc record medium.

15. The recording apparatus as set forth in claim 7, further comprising:

three narrow band pass filters configured to receive a radio frequency signal based on light reflected from the optical disc record medium, a center frequency of one of the filters is set to the predetermined rotational frequency of the optical disc record medium, and an output of the filters is configured to control an actual rotation rate of the optical disc record medium.

16. The disc production method as set forth in claim 8, further comprising:

reading, by a recording apparatus, the fixed frequency information, including the fixed frequency information in a radio frequency signal based on light reflected from the optical disc record medium;

receiving the radio frequency signal by three narrow band pass filters;

setting a center frequency of one of the filters to the predetermined rotational frequency of the optical disc record medium; and controlling an actual rotation rate of the optical disc record medium based on an output of the filters.

17. The optical disc record medium as set forth in claim 1, wherein the fixed frequency information with which the optical disc record medium is controlled to rotate is recorded by periodically modulating the distance between the width-varied portions of the guide groove.

18. The recording apparatus as set forth in claim 4, wherein fixed frequency information, which represents a predetermined rotational frequency of the optical disc record medium, with which the optical disc record medium is controlled to rotate is recorded thereon by periodically modulating the distance between the width-varied portions of the guide groove, wherein the information obtainment means obtains the fixed frequency information with which the optical disc record medium is controlled to rotate based on a detected result of a period for which the distance between the width-varied portions of the guide groove is modulated, and wherein the information obtainment means includes rotation control means for controlling the optical disc record medium to rotate based on the fixed frequency information with which the optical disc record medium is controlled to rotate.

* * * * *